May 3, 1932.  A. POTDEVIN  1,856,853

PASTE FOUNTAIN

Filed July 10, 1929

INVENTOR.
Adolph Potdevin
BY
Kiddle, Margeson and Horridge
ATTORNEYS.

Patented May 3, 1932

1,856,853

UNITED STATES PATENT OFFICE

ADOLPH POTDEVIN, OF GARDEN CITY, NEW YORK, ASSIGNOR TO POTDEVIN MACHINE COMPANY, OF BROOKLYN, NEW YORK, A CORPORATION OF NEW YORK

PASTE FOUNTAIN

Application filed July 10, 1929. Serial No. 377,226.

This invention relates to an improvement in paste fountains and has for one of its objects the provision of an improved construction wherein clogging of the paste regulating aperture due to paste lumps forming in the pan is eliminated.

I provide also a construction wherein the paste feeding roller is adjustable, means being provided, however, whereby the extent of adjustment is limited by safety bearing surfaces so that injury to the lump crushing mechanism is eliminated.

In the accompanying drawings I have shown two embodiments of my invention.

Figure 1:
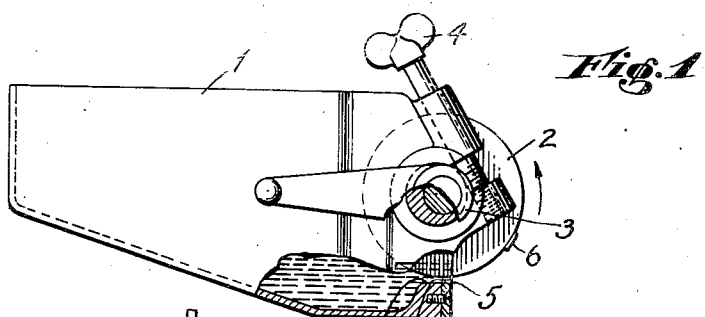
Fig. 1 is a part sectional side elevation of one embodiment of my invention.
Figure 2:
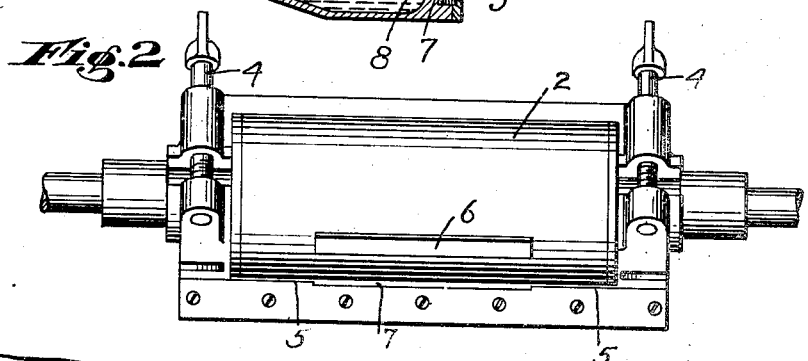
Fig. 2 is an end elevation of the roller end of the fountain of Fig. 1.
Figure 3:
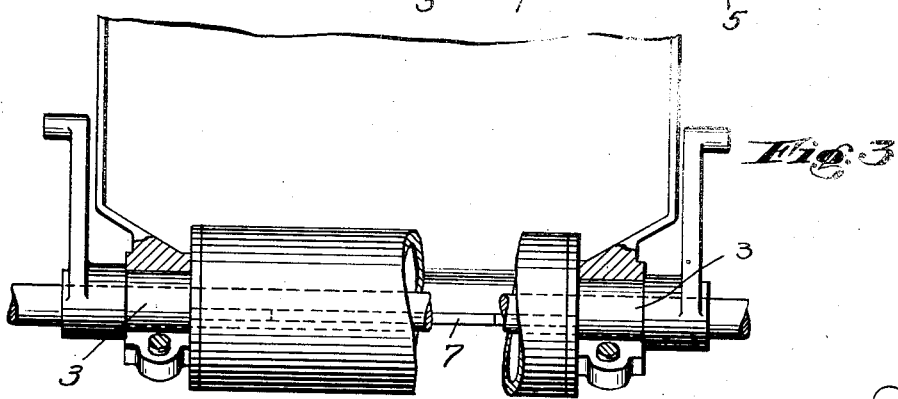
Fig. 3 is a plan view of the mechanism of Fig. 1 with part of the roller broken away.

Referring first of all to the embodiment of my invention illustrated in Figs. 1 to 3, inclusive, it will be seen that my invention provides a paste pan 1, and paste feeding roller 2.

The roller 2 is adjustably mounted in eccentric bearings 3. By backing out thumb screws 4, the roller can obviously be adjusted vertically with respect to the clearance between the roller periphery and the edge 5 of the pan 1.

On the face of the roller I provide a crushing member or bar 6. This member as will be seen from Figs. 1 and 2 extends lengthwise of the roller, terminates an appreciable distance from the ends thereof, and projects throughout its length from the roller periphery.

A recess 7 is provided in the pan 1 for accommodating the crushing member 6.

The back wall of the pan at the recess 7 is cut back slightly as shown at 8 so as to provide something of a wedge-shaped space between the crushing bar 6 and the pan, to promote the crushing action of the bar, thereby preventing the forming of dry sections or rings on the paste feeding portions of the roller 2.

In adjusting the roller 2 vertically it is obvious that the same cannot be lowered until the crushing bar hits the pan, because of the fact that the ends of the roller beyond the bar will contact with the pan before the roller has been lowered to this extent.

It will be seen, therefore, that I have provided a paste fountain of improved construction, employing a crushing member for crushing any lumps which form in the paste, means being provided whereby adjustment of the roller to a point where the bar will jam is prevented.

Figure 5:
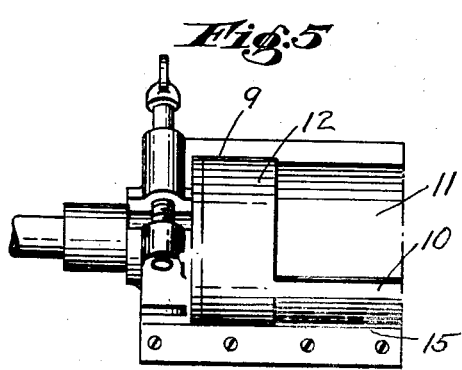
Fig. 5 is a fragmentary plan view of the embodiment of Fig. 4.
Figure 4:
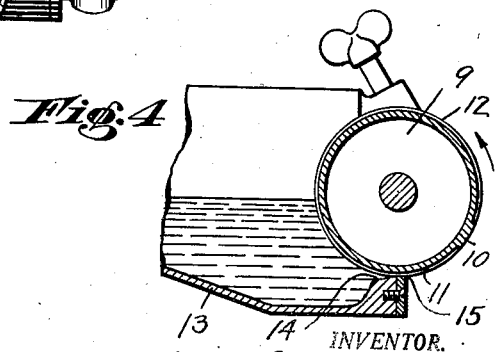
Fig. 4 is a fragmentary sectional side elevational view of a modification.

In the embodiment of my invention illustrated in Figs. 4 and 5, the paste feeding roller 9 is provided integrally with raised crushing portion 10, depressed paste feeding surface 11, and raised circular surfaces 12 level with the portion 10, thus preventing the jamming of portion 10 against paste regulating edge 15.

The pan 13 as shown at 14 is shaped similar to the formation provided in Fig. 1 whereby a wedge-shaped space is provided between the crusher and pan to ensure crushing of the paste lumps.

It is to be understood that changes may be made in the details of construction above described within the purview of my invention.

What I claim is:—

1. In a paste fountain, the combination of a paste pan, a paste feeding roller adjustable relatively to the paste pan, the periphery of said roller being provided with a paste transferring portion or surface and with lump crushing means, the latter cooperating with the edge of the paste pan, and means for preventing engagement of the lump crushing means with the pan in adjusting the roller.

2. In a paste fountain, the combination of a paste pan, a paste feeding roller adjustably mounted on said pan, a crushing member mounted on and projecting from the face of said roller and cooperating with the edge of the paste pan, the face of the roller beyond the ends of the crushing member being engageable with the pan to prevent engagement of the crushing member with the pan in adjusting the roller.

3. In a paste fountain, the combination of a paste pan, a paste feeding roller adjustably mounted thereon, a crushing member on the face of the roller, said pan being provided with a surface cooperating with the crushing member to provide a wedge-shaped space for the entry of paste lumps to be crushed, this wedge-shaped space providing for the crushing action on the lumps to be progressively increased, a portion of said roller when the roller is moved to its extreme position toward the pan being adapted to engage the pan to prevent contacting of the crushing member with the pan.

4. A paste fountain comprising a paste pan, a roller adjustable relatively thereto, said roller being provided on its periphery with a depressed paste feeding surface, and intermediate its ends with a raised lump crushing surface cooperating with the pan, the periphery of the roller at each side of the lump crushing surface being provided with raised safety bearing surfaces adapted to engage the pan in the adjustment of the roller toward the pan for preventing contact of the lump crushing surface with the edge of the pan.

This specification signed this 8th day of July, 1929.

ADOLPH POTDEVIN,